United States Patent
Grandage

(10) Patent No.: US 7,201,361 B2
(45) Date of Patent: Apr. 10, 2007

(54) GATE VALVE HAVING REDUCED FRICTION

(75) Inventor: Ronald Ellis Grandage, West Yorkshire (GB)

(73) Assignee: Aeon Plc, Surrey (GB)

( * ) Notice: Subject to any disclaimer, the term of this patent is extended or adjusted under 35 U.S.C. 154(b) by 0 days.

(21) Appl. No.: 10/333,609

(22) PCT Filed: Jul. 20, 2001

(86) PCT No.: PCT/GB01/03266

§ 371 (c)(1),
(2), (4) Date: May 14, 2003

(87) PCT Pub. No.: WO02/08643

PCT Pub. Date: Jan. 31, 2002

(65) Prior Publication Data

US 2003/0173535 A1    Sep. 18, 2003

(30) Foreign Application Priority Data

Jul. 26, 2000  (GB) ................................. 0018222.0

(51) Int. Cl.
*F16K 3/316* (2006.01)

(52) U.S. Cl. ...................... 251/214; 251/329; 251/330; 251/355

(58) Field of Classification Search ................ 251/330, 251/214, 355, 326–329; 137/375; 277/502
See application file for complete search history.

(56) References Cited

U.S. PATENT DOCUMENTS

| | | | | |
|---|---|---|---|---|
| 2,924,233 A | * | 2/1960 | Michaels | ..................... 251/330 |
| 4,354,425 A | * | 10/1982 | Bruton et al. | ............... 251/61.4 |
| 4,373,700 A | * | 2/1983 | Buchta | ........................ 251/330 |
| 4,991,619 A | * | 2/1991 | della Porta | .................. 251/330 |
| 5,836,569 A | * | 11/1998 | Wurangian | ................... 251/326 |

FOREIGN PATENT DOCUMENTS

| | | |
|---|---|---|
| DE | 1 032 992 | 6/1958 |
| EP | 0 171 693 | 2/1986 |
| EP | 0 355 301 | 2/1990 |
| FR | 2 343 953 | 8/1977 |
| GB | 2 070 203 A | 9/1981 |

* cited by examiner

*Primary Examiner*—John Bastianelli
(74) *Attorney, Agent, or Firm*—Nixon & Vanderhye

(57) ABSTRACT

Valve having a valve housing, a valve member slidable in the valve housing between open and closed positions, and a friction reducer to reduce friction between the valve member and the valve housing. The friction reducer comprises at least one guide shoe made of low friction material, to provide a low friction sliding surface, the guide shoe being removably insertable into a slot in the valve member. The guide shoe is arranged to cooperate with the slot such that the ends of the slot prevent the guide shoe from being extracted from the valve member in the direction of movement of the valve member, when the valve member is in position with the valve housing.

13 Claims, 4 Drawing Sheets

GATE VALVE HAVING REDUCED FRICTION

BACKGROUND OF THE INVENTION

The invention relates to valves and particularly, though not exclusively, to gate valves.

A typical gate valve comprises a valve housing and an obturator movable in the housing between open and closed positions.

When the valve is closed or partly closed, the pressure is greater on one side of the obturator than on the other. This unbalanced pressure creates a force pushing the obturator against supporting surfaces in the housing.

When the valve is operated, this force creates a friction drag which resists movement of the valve member. The force required to operate the valve is proportional to the friction drag.

It is beneficial to reduce the operating force for both hand operated and power operated valves. The equipment for the power operation of valves is generally sold in a range of fixed sizes. If the operating force can be reduced sufficiently, it becomes possible to use a lower powered, lower cost operating device.

SUMMARY OF THE INVENTION

It is an object of a first aspect of the invention to provide an effective low cost method of substantially reducing the force required to operate valves.

According to a first aspect of the invention, there is provided a valve comprising a valve housing, a valve member slidable in the valve housing between open and closed positions, and means to reduce friction between the valve member and the valve housing.

Preferably, low friction slide surfaces are provided on the obturator of a gate valve.

Preferably, the obturator is encapsulated in or made from elastomeric material to provide resistance to corrosion, the low friction sliding surfaces being provided externally of the elastomeric material.

It is generally desirable to have elastomeric material to provide corrosion protection but elastomeric material generally has a high coefficient of friction resulting in high friction drag and high operating forces.

By providing low friction sliding surfaces externally of the elastomeric material, the corrosion resistance of the obturator is retained, while reducing the force required to operate the valve.

The low friction sliding surfaces may be provided by at least one guide shoe made of low friction material, and attachable to the obturator.

Preferably there are two guide shoes, provided at opposite edges of the obturator.

Each shoe is preferably attachable to the obturator by inserting the shoe into a slot in the obturator.

Preferably, each slot is closed at its upper and lower ends, trapping the guide shoe within the slot such that vertical movement of the guide shoe with respect to the obturator is substantially prevented.

Each guide shoe may be a press fit in the associated slot.

Each guide shoe may be provided with ridges which dig into the elastomeric material of the obturator to help retain the guide shoe in the associated slot.

The housing may be provided with parallel guide ribs extending down each side of the housing, these ribs cooperating with parallel guide channels in the guide shoes, so that the obturator is guided by cooperation of the ribs and channels, as the obturator moves between the open and closed positions.

The ribs on the valve housing may be of metal or of metal provided with a corrosion protected coating. The cross section of the guide ribs is preferably rectangular, although other shapes may be used.

The ridges on the guide shoes may be of saw tooth cross-section to make it relatively easy to insert each guide shoe into the associated slot, but relatively hard for the shoe subsequently to move out of the slot again.

The inner surfaces of each guide shoe fit around the associated guide rib of the housing, with a sufficient clearance to allow sliding motion to take place.

The back of each guide shoe may be shaped to fit into a recess within the associated guide slot of the obturator. For example each guide shoe may be provided with a central rib extending along its length from the back of the shoe. Many other shapes are however possible. This prevents each guide shoe from sliding out of the associated guide slot parallel to the direction of valve operation.

Each recess may be coated with elastomeric material although this is not essential.

Embodiments of the invention have the following advantages.

A device is provided for reducing the operating force in a gate valve.

The device is made from low friction material.

The device may be made from plastics material.

Acetal plastics may be used.

The device may be used with an obturator encapsulated in or made from elastomeric material.

The device may consist of at least one channel cooperating with at least one guide rib on the housing or any part of the valve.

The device may be retained in the obturator by means of an interference fit with elastomeric material.

The device may have ridges on its surface in contact with the elastomeric material.

The ridges may be shaped so that the device may be inserted more easily than it can be withdrawn.

The device may be arranged to cooperate with a recess in the obturator so that it cannot be extracted from the obturator in the direction of obturator motion.

According to a second aspect of the invention, there is provided a valve comprising a valve housing, a valve member slidable in the valve housing between open and closed positions, a valve operating member associated with the valve member and passing out of the valve housing through an aperture, the valve having means to seal the aperture when the valve member is in the open position.

The sealing means may comprise an auxiliary seal on the valve member which comes into sealing contact with both the valve housing and the valve operating member when the valve member is in the open position.

Alternatively, there may be an auxiliary seal on the valve housing which is contacted by the valve member when the valve member is in the open position.

Another possibility is that there may be a first auxiliary seal on the valve member and a second auxiliary seal on the valve housing, the two auxiliary seals coming into sealing contact with one another and with the valve operating member when the valve member is in the open position.

Preferably there is a main seal to provide sealing contact between the valve operating member and the aperture.

When it is desired to replace or repair the main seal, the valve member may be moved into the open position, in which the auxiliary seal seals the aperture while the main seal is being replaced or repaired.

The invention includes a valve having the features of both the first and second aspects of the invention.

BRIEF DESCRIPTION OF THE DRAWINGS

By way of example, specific embodiments of the invention will now be described, with reference to the accompanying drawings in which.

DETAILED DESCRIPTION OF PREFERRED EMBODIMENTS

Figures 1, 2:
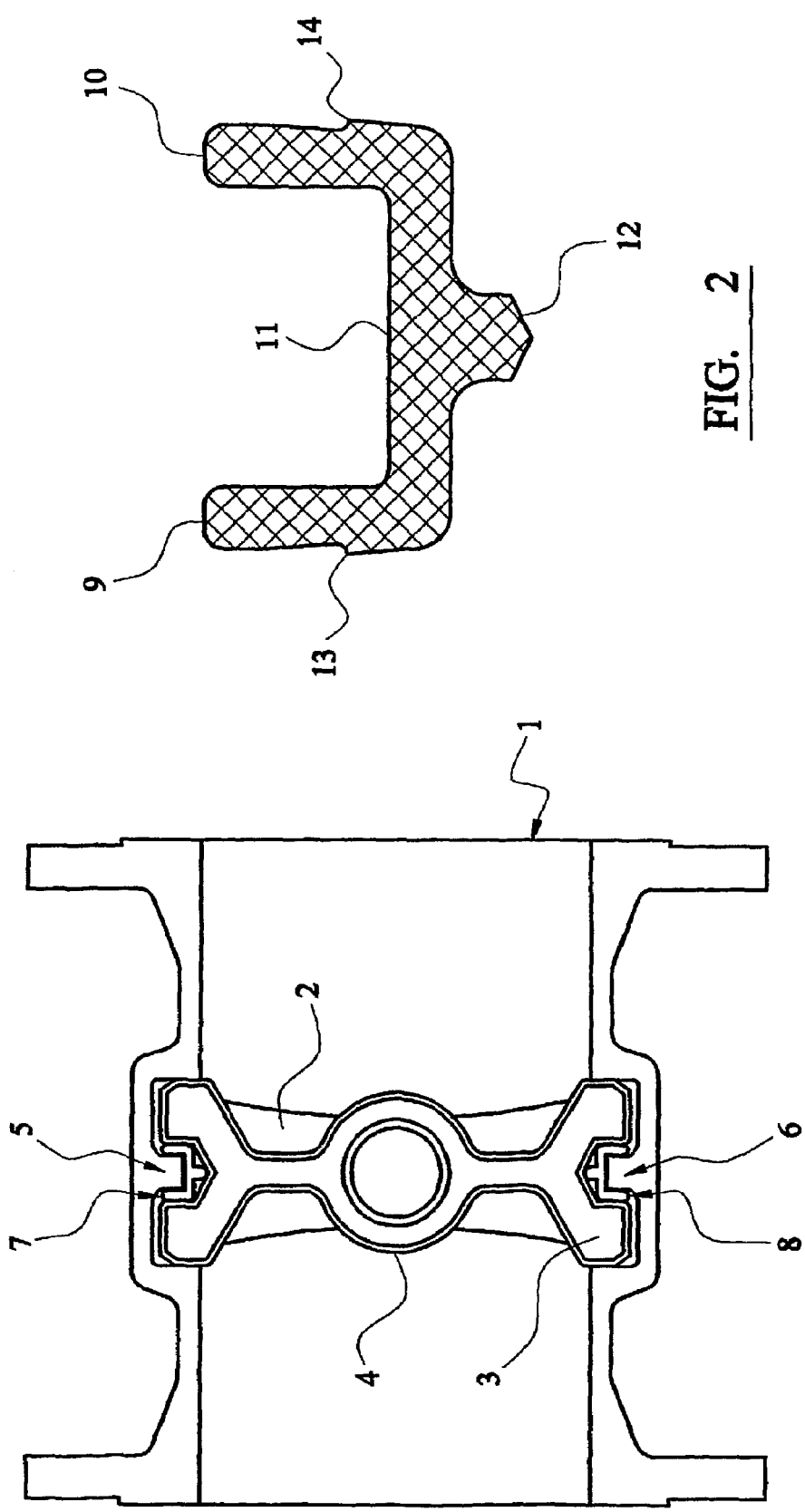
FIG. 1 is a cross sectional view of an embodiment of valve according to the invention, taken on the centre line of the valve.
FIG. 2 is a cross-sectional view, to a larger scale, through a guide shoe of the valve shown in FIG. 1.
Figure 4:
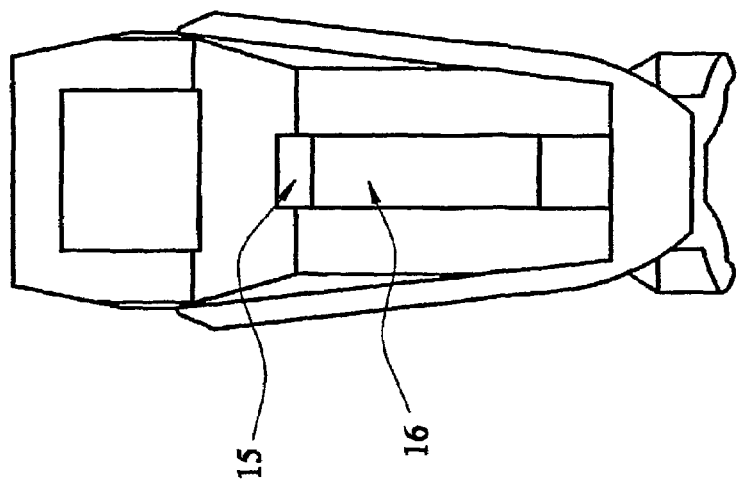
FIG. 4 is a side view of the obturator shown in FIG. 3.
Figure 3:
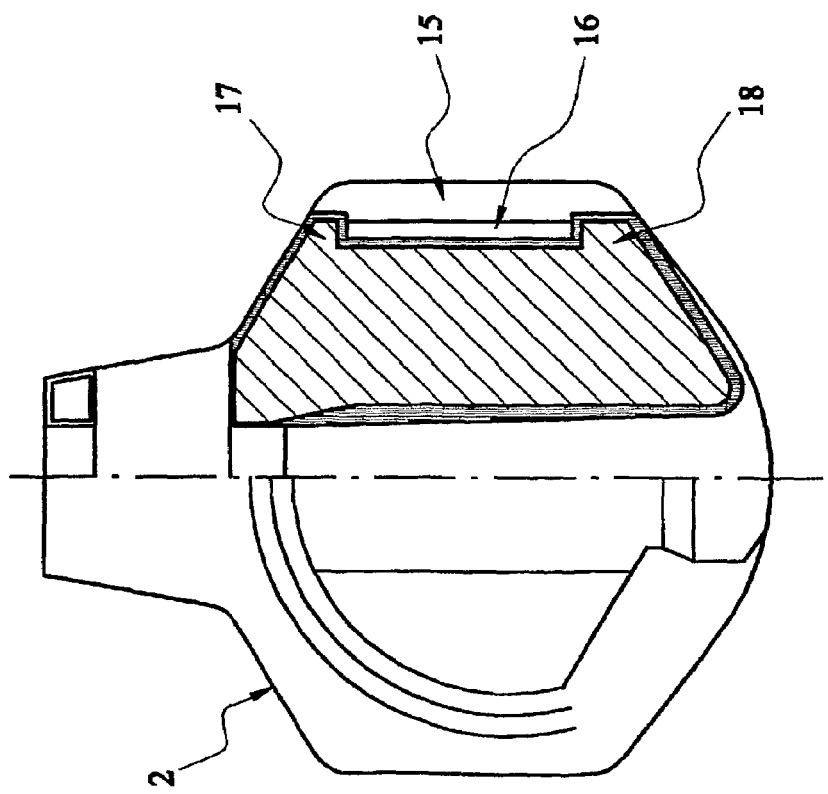
FIG. 3 is a part cross-sectional view through an obturator of the valve, taken in the plane of the obturator.

The valves shown in FIGS. 1 to 4 has a valve housing 1 and a gate or obturator 2 moveable down into the housing 1 to close the valve, and movable back up again to open the valve.

The obturator 2 comprises a metal casting 3 encapsulated in an elastomeric substance 4.

At each vertical edge of the obturator there is a slot 15 having a recessed portion 16. The recessed portion 16 is closed at its upper 17 and lower 18 ends.

Plugged into each slot 15 is a guide shoe having the cross section shown in FIG. 2. A central rib 12 at the rear of each guide shoe engages in the associated recess 16 and longitudinal ridges 13, 14 dig into the elastomeric material at the sides of the associated slot 15. This digging in tends to retain each guide shoe in its associated slot in the horizontal direction and the guide shoe cannot move out of the slot in the vertical direction because of the engagement of the upper and lower ends of the rib 12 with the upper 17 and lower 18 ends of the recessed portion 16 of the associated slot 15.

The housing 1 is provided with oppositely facing guide ribs 5 and 6 and, as best seen in FIG. 1, these cooperate with the channels in the guide shoes 7 and 8 to guide the obturator between its open and closed positions. Each rib projects between side arms 9 and 10 of the associated guide shoe, and the inner face of each guide rib is closely adjacent to the inner face 11 of the associated guide shoe channel.

Because of the inter-position of the guide shoes between the valve housing 1 and the obturator 2, the obturator 2 can still be encased in corrosion resistant material, which usually has a high coefficient of friction. This does not mean that more power is required to operate the valve because the only contact between the valve housing and the valve obturator is via the low coefficient of friction guide shoes 7 and 8.

Figure 5:
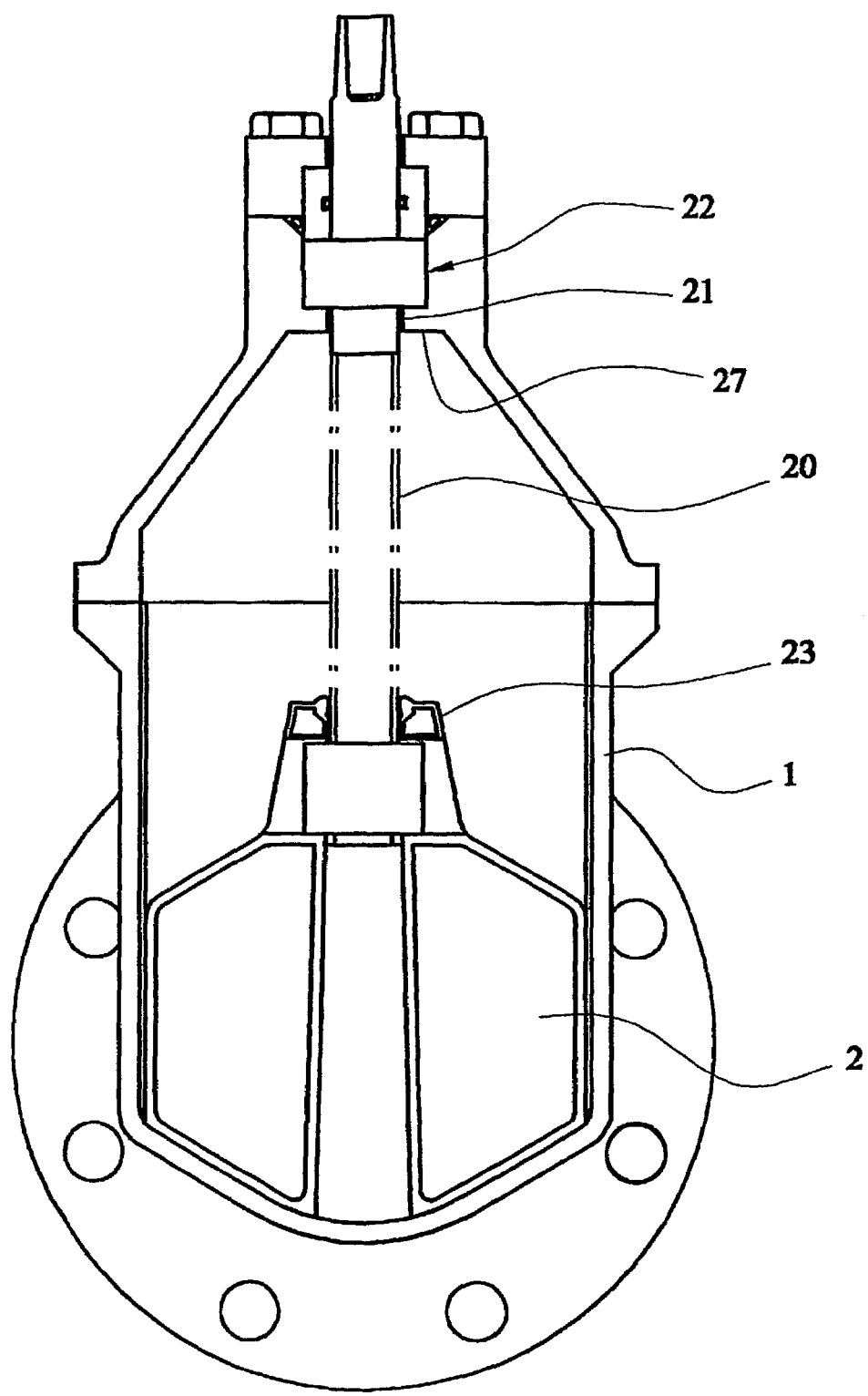
FIG. 5 is a cross-sectional view through a second embodiment of valve according to the invention, looking in the direction of flow.

The valve shown in FIG. 5 operates in a generally similar manner to that shown in FIG. 1, having a valve housing 1 and an obturator 2. The obturator 2 moves up or down to open or close the valve as desired.

The obturator 2 is operated by a valve stem 20 which passes out of the housing 1 through an aperture 21. A main seal 22 is provided to reduce the possibility of fluid leaking out of the valve housing around the valve stem 20.

In many circumstances it may be necessary to replace or repair the main seal 22, without taking the valve out of service.

Figures 6, 7:
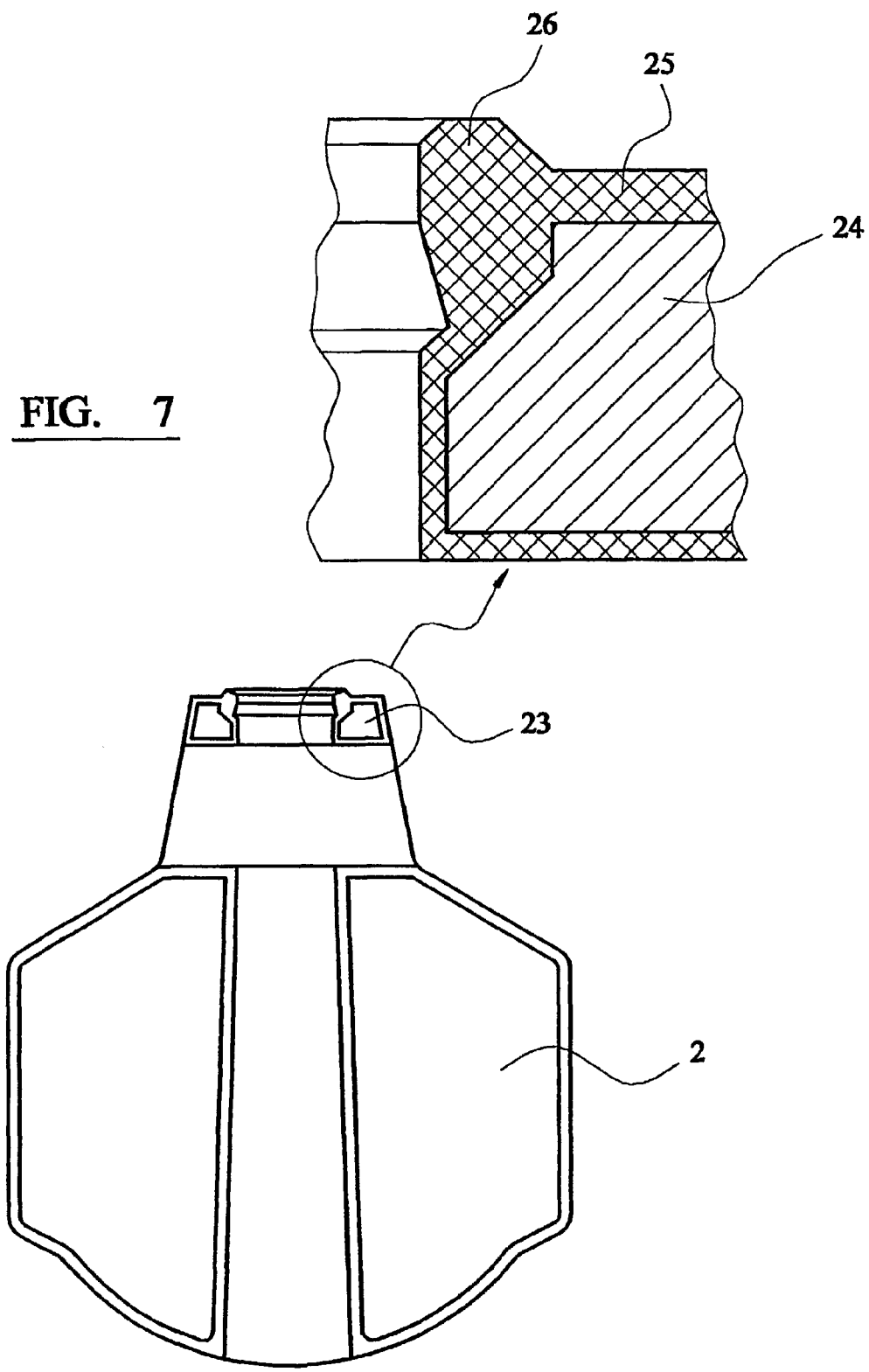
FIG. 6 is a view of the obturator of the valve shown in FIG. 5.
FIG. 7 is a detailed view of part of the obturator shown in FIG. 6.

To facilitate this, the upper part of the obturator 2 is provided with an annular auxiliary sealing member 23 which is shown in more detail in FIG. 7. There is an annular metal casting 24 surrounded by elastomeric material 25. The elastomeric material 25 has a protruding annular rib 26.

If it is decided to provide an auxiliary seal around the valve stem 20, while the seal 22 is replaced or repaired, the obturator is raised into the fully open position. In this position, the protruding annular rib 26 is compressed upon the underside 27 of the upper part of the valve housing 1. This compression causes the elastomeric material 25 to be compressed radially inwardly to seal against the valve stem 20.

Instead of providing an auxiliary seal on the obturator, the auxiliary seal could be provided on the underside 27 of the valve housing 1, or alternatively there could be two auxiliary seals, one on the obturator and one on the housing, which are compressed against one another and against the stem 20 when the valve member moves into the open position.

The valve shown in FIGS. 1 to 4 may be provided with an auxiliary seal as shown in FIGS. 5 to 7.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A valve comprising:
   a valve housing having an interior surface on an underside of the housing;
   a valve member slidable in the valve housing between open and closed positions;
   a valve operating member associated with the valve member and passing out of the valve housing through an aperture;
   seal means mounted on said valve member for sealing the aperture when the valve member is in the open position, said seal means being spaced from said valve operating member when said valve member is in said closed position, said seal means including a seal surface which abuts against the interior surface of the underside of the valve housing whereby said seal means is compressed radially inwardly and seals against the valve operating member when the valve member is in the open position.

2. A valve according to claim 1 wherein the valve comprises a gate valve and the slidable valve member comprises an obturator with a low friction sliding surface.

3. A valve according to claim 2 wherein the obturator is encapsulated in or made from elastomeric material to provide resistance to corrosion, the low friction sliding surface being provided externally of the elastomeric material.

4. A valve according to claim 3 wherein the low friction sliding surfaces are provided by at least one guide shoe made of low friction material, and attachable to the obturator.

5. A valve according to claim 4 wherein there are two guide shoes, provided at opposite edges of the obturator.

6. A valve according to claim 4 wherein the guide shoe is provided with ridges arranged to contact the elastomeric material of the obturator to help retain the guide shoe in the associated slot.

7. A valve according to claim 6 wherein the ridges on the guide shoe are shaped to make it relatively easy to insert the guide shoe into the associated slot, but relatively hard for the shoe subsequently to move out of the slot again.

8. A valve according to claim 4 wherein the housing is provided with parallel guide ribs extending down each side of the housing, these ribs cooperating with parallel guide channels in the guide shoes, so that the obturator is guided by cooperation of the ribs and channels, as the obturator moves between the open and closed positions.

9. A valve according to claim 8 wherein the ribs on the valve housing comprise metal or metal provided with a corrosion protected coating.

10. A valve according to claim 8 wherein the inner surfaces of each guide shoe fit around the associated guide rib of the housing, with a sufficient clearance to allow sliding motion to take place.

11. A valve according to claim 6 wherein the back of the or each guide shoe may be shaped to fit into a recess within the associated guide slot of the obturator.

12. A valve according to claim 1 wherein when it is desired to replace or repair a main seal, the valve member is moved into the open position, in which the sealing means seals the aperture while the main seal is being replaced or repaired.

13. A device for employment in a valve according to claim 1 wherein the device reduces the operating force in said valve.

* * * * *